0
United States Patent Office 3,509,730
Patented May 5, 1970

3,509,730
PRESSURE MODULATED BUBBLE STIRRING APPARATUS FOR FREEZING SOLUTE OUT OF SOLUTION
John D. Harrison, Murrysville, Pa., assignor to Westinghouse Electric Corporation, Pittsburgh, Pa., a corporation of Pennsylvania
Filed Oct. 24, 1966, Ser. No. 588,883
Int. Cl. B01d 9/04
U.S. Cl. 62—58                                    1 Claim

ABSTRACT OF THE DISCLOSURE

The invention comprises apparatus, and a method for stirring a body of liquid in the critical area of a stagnant, boundary layer associated therewith, the apparatus comprising means for alternately decreasing and increasing the pressure within a container holding the liquid, the decreasing and increasing pressure being effective to expand and contract gas bubbles within the boundary layer, the expanding and contracting bubbles being effective to energize and move the liquid in the area of the boundary layer.

---

This invention results from work done under Contract 14-01-0001-605 with the Office of Saline Water of the United States Department of the Interior.

The present invention relates to a method and to apparatus employing the method for stirring and mixing liquids and thereby increasing the rate of heat and mass transfer within the liquids.

It is generally known that a liquid matrix can be stirred with a stream of gas bubbles. The gas can be directly forced into the liquid to be agitated through tubes or tuyeres or the gas may be dissolved in a liquid or contained in a solid that is blown into the liquid, the gas being released within the liquid upon coming in contact therewith. The gas forms bubbles which rise due to their buoyancy characteristic and thus stir the liquid.

However, it is also generally known that in apparatus for heating liquids, a stagnant layer or film of liquid, generally called the boundary layer, exists adjacent the surface of the wall separating the liquid from a source of heat such as a gas flame in a gas fired boiler. This stagnant film exists even when the temperature value of the liquid is brought to and passes through the liquid's boiling point. Further, this stagnant film or boundary layer exists in the most critical of areas, namely the area of the wall through which the heat from the heat source should be transferred with the highest efficiency.

Therefore, there has been considerable interest in liquid agitation within the boundary layer and in ways and means to improve heat transfer rates within heated liquids. Simply increasing the temperature of the heat source and heated liquid only serves to increase boiling and evaporation rates of liquids without substantial attendant circulation results in the critical area of the boundary layer.

Mechanical stirring of bulk liquid has been employed but with limited success; a stagnant boundary layer remains adjacent the heated surface because bulk stirring produces only a streamline flow of liquid which inherently does not disturb the boundary layer.

In solute-solution separation processes by freezing where the pure solvent (usually water) is frozen to form ice, as in the cases of concentrating beer and purifying impure water (for example, salt water), the difficulty in realizing the full separating potential of the freezing process lies in the entrapment of pockets of concentrated solute in the ice at the freezing interface. Control of the solidification process to obtain pure solute-free ice, requires maintenance of a relatively smooth, planar interface between the ice and liquid during freezing. Directional solidification by withdrawing heat from the solution and transmitting it through the ice is the first step in stabilizing the planar interface.

The freezing process inherently rejects substances (e.g. air, salt, alcohol) soluble in water. However, as the planar ice liquid interface travels into the water, increasing concentrations of solute collect at the interface so that the smoothness of the interface gradually changes and becomes jagged, resulting in the entrapment of the concentrated solute in the ice. This happens because the ice liquid interface behaves in the manner similar to that of a semi-permeable membrane; the water passes through but not the solute. Consequently, projections of substantially pure ice form between pockets of concentrated solute. The end result is an ice formation having a slushy characteristic because it has retained concentrations of solute that would ordinarily have been rejected by the freezing process had the ice liquid interface remained planar.

The end product is thus not a concentrated solute, such as beer concentrate, or a substantially pure body of frozen solvent, such as ice, ready for melting and/or consumption, but a nonhomogeneous combination that is less suitable for the use intended.

Therefore, effective stirring or agitation at the interface to disperse the accumulation of rejected solutes would permit freezing to progress at reasonable rates while maintaining the planar characteristic of the interface. Mechanical stirring of the bulk solution and ultrasonic stirring methods and means have been employed. Again, however, bulk stirring leaves a stagnant boundary layer at the freezing surface and ultrasonic techniques have given only erratic results.

In desalination processes employing reverse osmosis membranes, external pressure is applied to the salt water to force the water solvent through the membrane into the fresh water. The forcing of the water solvent through the membrane causes the brine to collect at the surface of the membrane on the salt water side thereof with the result that the external pressure applied to the salt water becomes less effective. If the brine were dispersed from the membrane surface, less pressure would be needed to effect the reverse osmosis process, thereby making the process more effective and efficient.

In flash evaporator units designed to extract a pure solvent from solution, the solution is heated and directed through a flash chamber or chambers along the bottom wall thereof. The chamber or chambers are held at reduced pressure ambients in order to cause the heated solution to flash into vapor, the vapor being condensed and collected as the pure solvent. To enhance the flashing (vaporizing) process, the inside surface of the bottom wall of the flash chamber has been provided with liquid flow obstacles designed to give turbulence to an otherwise streamline flow of liquid. Such means have proved advantageous in increasing the vapor producing potential but ample room for improvement and development exists in this area of liquid flashing. The liquid flow obstacles remain essentially mechanical means for stirring which, as mentioned above, still leave a stable or stagnant boundary layer of liquid adjacent the wall surface of the container or chamber.

The present invention provides a stirring means and method that is highly effective in causing turbulence in a liquid and particularly in the boundary layer area thereof. This is accomplished by the periodic expansion and contraction of existing or newly created (nucleated) gas bubbles in response to a controlled modulation of the matrix liquid's hydrostatic pressure. The source of the gas may be existing bubbles, artificially introduced bubbles, nucleated bubbles from gases dissolved in the liquid, or vapor bubbles resulting from the vaporizing of the matrix liquid in vapor generators and similar devices.

The pressure modulation may be provided by any suitable means, for example, a cyclically actuated piston disposed in pneumatic communication with a substantially pressure tight enclosure containing the liquid, though the invention is not limited thereto.

With the present invention, stirring can be either confined to areas of local nonhomogeneity or pre-existing bubbles, or it can be exercised throughout a body of liquid by controlling the cycle configuration of the periodically applied hydrostatic pressure. For example, with a gradually decreasing pressure cycle, the bubbles form and grow to a relatively large size and then collapse with a rapid increase of pressure. Relatively few bubbles are formed, however, with a gradually decreasing pressure cycle. With a rapid decrease in pressure, myriads of bubbles form but do not have the opportunity to grow to a large size; the bubbles collapse with an increase in pressure, the rate at which they collapse depending upon the rate of the pressure increase.

Thus, it is readily seen that the character of the agitation can be regulated by appropriate choices of the pressure modulated wave forms which in turn allows flexibility in tailoring the agitation for specialized and complex mixing problems.

It is therefore an object of the present invention to provide novel means and method for generally mixing, blending and stirring liquids and activating therein an otherwise stagnant liquid boundary layer.

Another object of the invention is to provide novel means and method for increasing the efficiency of desalination apparatus and processes.

A further object of the invention is to provide a unique means and method for effecting highly increased heat and mass transfer rates within a liquid.

Yet another object of the invention is a method for increasing the efficiency of heat exchange in vapor generators and heat exchange apparatus by controlling the nascent vaporizing condition of a heated liquid.

A more particular object of the invention is to provide a means and method of dispersing solute accumulation at the ice-liquid interface during freezing of a solvent within a solution.

Another more particular object of the invention is to provide a unique means and method for increasing the flash evaporation potential of a heated solution flowing through a flash evaporator apparatus.

Yet another object of the invention is to attain the foregoing objects by periodically expanding and contracting gas bubbles within a body of liquid and within an otherwise motionless liquid film or layer within the body of liquid.

These and other objects of the invention will become more apparent from the following detailed description taken in conjunction with the drawing, in which.

Figure 1:
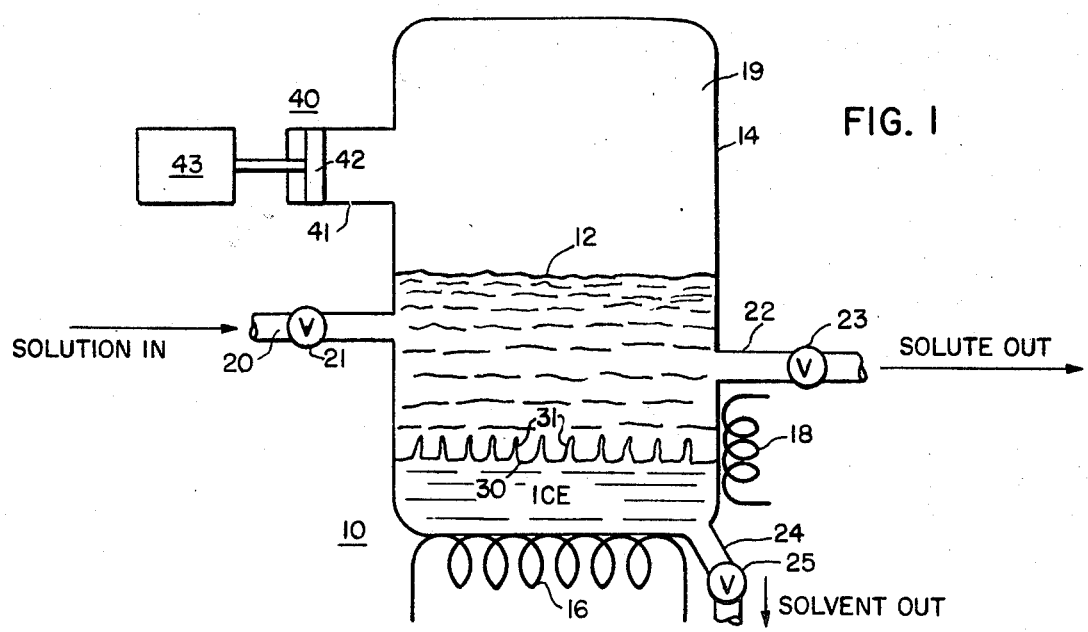
FIG. 1 is a schematic representation of means for separating a solute and solvent in solution by freezing employing means for agitating the solution in accordance with the principles of the present invention.

Specifically, there is shown in FIG. 1 an apparatus 10 for cooling a solution 12 in such a manner that a substantially pure solvent is frozen and thereby separated from a solute. The apparatus includes a container 14, means 16 for cooling the solution in the container, and heating means 18 for melting the thus frozen solvent after the freezing process has efficiently separated a sufficient quantity of solute and solvent.

The freezing means 16 is diagrammatically depicted as a refrigerant coil though other means may be employed in place thereof or in conjunction therewith to freeze out the solvent from solution. The heating means 18 may be a coil energized by an electrical current produced by a suitable power supply (not shown), it may be of the type in which hot steam is conducted therethrough, or it may comprise any other suitable means for heating and melting the frozen solvent.

The solution to be separated is directed into the container 14 by a conduit 20 with the amount of solution admitted being controlled by a valve 21 disposed in the conduit so that a space 19 is provided in the upper portion of the container. In a similar manner, the solute (after solvent freezing) can be removed from the container in a controlled manner by conduit 22 and valve 23 respectively. A third conduit 24 and valve 25 are provided at the bottom of the container for withdrawing the solvent after it has been melted by the heating means 18.

The conduits 20 and 22 are disposed at a height above the anticipated freezing level of the solvent so that the ice formed in the container 14 will not block the ends of the conduits opening into the container. Thus, in FIG. 1, the location of the conduits 20 and 22 is illustrative only.

In operation, and beginning with an empty container 14, the valves 23 and 25 are closed before any liquid is directed thereto. The valve 21 is then opened and the solution 12 is directed into the container, and the container filled to a level appropriate for freezing a desired amount of solvent to a solidification level below that of the conduit 22. When the desired liquid level is reached, the valve 21 is closed and the cooling process begins for example, by directing a refrigerating coolant through coiled tube structure 16.

In order to obtain a substantially pure, solute free solvent and a highly concentrated solute, it is necessary to maintain a highly planar ice-liquid interface. The planar interface is started by withdrawing heat from the solution and transmitting it through the thus formed ice by operation of the cooling means 16 disposed adjacent the bottom of the container 14. In FIG. 1, however, the interface, designated 30, is shown as having a jagged surface with pointed ice projections 31 (only representatively shown) extending into the liquid (solution). As explained above, this phenomenon occurs with the progressive advancement of the ice into the area occupied by the liquid 12 as the solvent freezes out of solution, and the solution becomes more concentrated with solute. The solute tends to collect adjacent the interface 30 of the ice and liquid causing the ice to reach out into the concentrated solute where molecules of solvent exist as an entity within the solution. As the solvent freezes out of the solution and as the ice advances into the liquid, pockets of concentrated solute become entrapped between the ice projections 31 resulting in a final ice product that is not a substantially pure solvent as desired.

In order to move the concentrated solute from the interface 30 and disperse it in the remaining solution, a variety of liquid stirring or agitating means have been employed without notable success as mentioned earlier. As explained above, the means and methods heretofore used to stir liquids have had limited success in moving liquid in the boundary layer that exists adjacent a fixed surface, for example, the ice-liquid interface 30 in FIG. 1.

In accordance with the present invention, a fluid pressure modulation apparatus, generally designated 40, is provided for agitating and dispersing the liquid at the ice-liquid interface 30 so that the interface remains substantially planar during the freezing process, and a substantially pure solvent and a highly concentrated solute are the results of the freezing process.

The modulation means 40 comprises a sealed structural extension 41 of the container 14 supporting a piston 42 for reciprocating movement therein, and a means 43 for actuating the piston in a prescribed periodic manner. The structural extension is disposed above the operating level of the solution 12 so that the reciprocating movement of the piston is effective to periodically change the ambient pressure within the open space 19 above the liquid level within the container. The periodically changing ambient within the space 19 in turn increases and decreases the hydrostatic pressure within the body of the solution 12.

In operation, the decrease in pressure within the solution creates and expands in size a multitude of gas bubbles within the solution including the area of the boundary layer at the interface 30. The creation and expansion of bubbles in the liquid in the boundary layer, the critical area, immediately displaces the liquid therein (and elsewhere) thus functioning to agitate the liquid in an area heretofore ineffectively agitated by known stirring means. The bubbles then rise in the solution due to their inherent buoyancy thereby agitating the liquid again in the critical area of ice-liquid interface as well as elsewhere in the body of the solution. When the pressure increases, the gas bubbles contract or collapse which in turn creates a multiplicity of spaces into which the liquid immediately moves, thereby causing further agitation and mixing of the liquid.

It should also be noted that air bubbles will adhere to the ice and the ice projections 31 so that in the area of the boundary layer, a supply of bubbles can be available for the agitating (scrubbing) action which the moving bubbles and surrounding liquid exert upon the surface of the ice-liquid interface.

With the completion of the freezing process, the cooling function provided by the cooling means 16 is terminated and the valve 23 in conduit 22 is opened to remove the concentrated solute from the container. The heating means 18 is next operated to heat and melt the frozen solvent so that it may be removed from the container by flow through conduit 24 with the opening of valve 25.

In preliminary experiments involving the above described process and using salt water as the solution, the air pressure over the solution was cycled from 18 p.s.i.a. to 2 p.s.i.a. approximately five times per minute. At the low pressure value, myriads of fine bubbles formed at the ice-liquid interface, then grew in size and rose to give bulk stirring within the solution; at the high pressure value, the bubbles collapsed. As a result of the bubble stirring, a reasonably planar interface was maintained at an ice-growth rate of five centimeters per hour, whereas without the bubble stirring, the interface became irregular even at a growth rate of one tenth of a centimeter per hour. At the end of the process, the salt concentration was ten times higher in the brine (solute) than it was in the ice.

Figure 2:
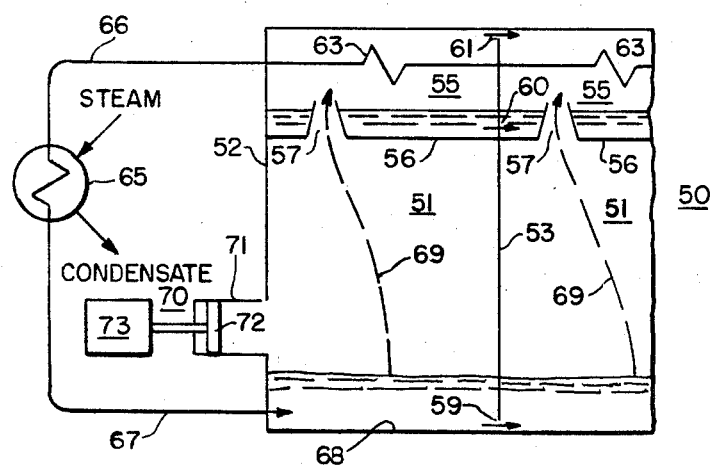
FIG. 2 is a partial schematic diagram of a flash evaporator apparatus employing liquid agitation means in accordance with the principles of the invention.

FIG. 2 shows another apparatus in which the principles of the invention may be advantageously applied. In FIG. 2, a partial schematic of a multistage flash evaporator apparatus 50 is shown having a plurality of flash evaporation stages each of which includes a flash chamber 51. The stages are formed by an external housing structure generally designated 52 and a plurality of internal partitions 53 separating the stages, only one partition being shown in FIG. 2. The housing structure 52 further defines an equal number of vapor condensing spaces 55 for receiving condensible vapors formed in the flash chambers 51. The condensing spaces are further defined by generally horizontally extending trays 56, and are provided with vertically extending vapor flow passages 57 so that the vapors formed in the chambers may rise upwardly through the flow passages into the condensing spaces 55.

Each vertical partition 53 is provided with a slot or orifice 59 adjacent the bottom wall of the flash chamber so that the flash chambers are disposed in fluid communication with each other. Each partition 53 is further provided with apertures 60 and 61, aperture 60 being located immediately above the trays 56 so that the falling condensate collected in the trays is free to flow through the apertures to a final tray (not shown) where it is collected for removal therefrom as substantially pure product liquid. The aperture 61 is located adjacent the top wall structure of the flash evaporator housing.

The flash evaporator stages may be maintained at successively lower pressure values by a suitable air ejector device (not shown) connected to the last and lowest pressure stage. The stages are serially disposed in fluid communication with each other by the aperture 61 provided in the upper portion of the partition 53 so that air and other noncondensible gases can be removed from the stages by the ejector device. In FIG. 2, the completely depicted stage is the first and highest pressure stage with the next adjacent stage being maintained at a somewhat lower pressure (higher vacuum).

In operation, an impure liquid, for example sea water, is successively directed through a series of condensing tube structures 63, respectively, disposed in the condensing spaces 55, and the impure liquid is progressively heated before evaporation by the heat extracted from the vapors condensing on the tube structures in the condensing spaces. From the last tube structure, the heated impure liquid is directed to a suitable top heater 65, as indicated by line (conduit) 66, where it is further heated (such as by steam supplied to the top heater) before being directed to the first stage of the flash evaporator as indicated by line 67.

As the heated liquid is directed into the first (and highest pressure) stage, a portion thereof is flashed into vapor because of the reduced pressure ambient prevailing therein, and the vapor flashed therefrom rises upwardly through the passage 57, as indicated by dashed arrows 69, into the condensing space 55. The vapor is condensed by heat transfer on the condensing tube structure 63 and falls into the tray 56 for collection. The unflashed liquid flows, in streamline manner, along an inside bottom wall surface 68 of the chamber into the succeeding and lower pressure stage chamber, via the orifice 59, wherein the same chain of events occur. As the liquid flows through the serially connected chambers, with flash evaporation occurring in each chamber, the liquid becomes more and more enriched or concentrated with solute. At the last stage (not shown), the concentrated liquid is removed therefrom, and a portion thereof, as is well known, may be recirculated through the flash evaporator apparatus 50.

Heretofore, in order to increase the turbulence and agitate the streamline flow of liquid through the flash chambers to enhance the vapor producing (flashing) potential of the liquid within the chamber, a variety of upwardly extending projections or liquid flow obstacles have been employed on the inside surface 68 of the chamber's bottom wall structure. As mentioned earlier, some measure of stirring success has resulted from such means, but the essential nature of streamline flow is that of a stagnant boundary layer, and therefore, remains substantially unaffected by such means.

In accordance with the principles of the invention, a fluid pressure modulation apparatus 70, similar to that shown in FIG. 1, is provided for agitating the boundary layer and dispersing the streamline flow of liquid in the flash chambers 51. The apparatus 70 comprises a sealed extension 71 in which a piston 72 is supported for reciprocating movement therein, and is actuated by a suitable actuating means 73 only representatively shown. The reciprocating motion of the piston is effective to periodically change the hydrostatic pressure within the flash evaporator 50.

As explained above, the periodic decrease in pressure within the flash evaporator stages produces and expands an abundant supply of bubbles within the liquid and within the otherwise stagnant layer of liquid at the bottom wall surfaces 86 of the flash chambers. The bubbles, being naturally buoyant, rise rapidly to the surface of the liquid to thereby assist and enhance with flash evaporation (vaporizing) process within the flash chambers. The force created by the bubble movement and by the movement of liquid to fill the vacuum created by the collapse or contraction of the multitude of bubbles with the increase of pressure, performs a scrubbing action at the surfaces of the chamber wall structures which functions to brush the bubbles and surrounding liquid away from the surfaces and into the body of the moving liquid. Thus, the total impact of the pressure modulation is one of substantial enhancement of the flashing process. This is of particular importance in desalination processes where efficiency, and therefore costs, are of paramount concern.

For purposes of illustration and explanation, only one fluid pressure modulating apparatus 70 is shown in FIG. 2, the apparatus being disposed on the end wall of the first stage of the flash evaporator housing structure 52. In the actual practice with multistage flash evaporation apparatus, however, pressure modulation of the stages is preferably accomplished by a plurality of such or similar means actuated in substantial unison, i.e. one for each stage, in order to maintain the pressure differentials existing between the stages and therefore maintain stable operation of the flash evaporation apparatus.

Figure 3:
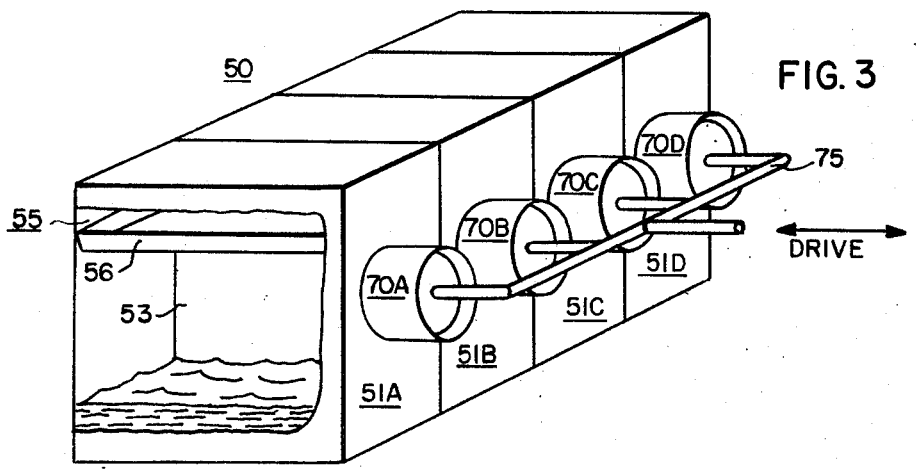
FIG. 3 is a diagrammatic representation of the multistage flash evaporator apparatus of FIG. 2 in which each stage of the apparatus is shown provided with liquid agitation means operated in unison.

In FIG. 3, apparatus for accomplishing unison pressure cycling within a plurality of flash evaporator stages is diagrammatically shown. In this example, four pressure modulating cylinders 70A through 70D are illustrated, one for each of the flash chambers 51A to 51D, the pistons of which are mechanically coupled together by a common connecting bar 75. The modulating cylinders function in the same manner as that described in connection with the modulating apparatus 70 of FIG. 2, except that for reasons of mechanical expediency, the modulating cylinders depicted in FIG. 3 are shown disposed on a side wall of each of the flash chambers 51A to 51D. The connecting bar 75 is actuated by a suitable actuating mechanism (not shown).

In operation, the ambient pressures in the stages are periodically varied in substantial unison by actuation of the common connecting bar 75. The changing ambient pressure in turn varies the hydrostatic pressure within the impure liquid flowing in the stages so that myriads of bubbles are formed in the liquid to effect the above described stirring and agitating action within the liquid. The average pressure value within each stage is maintained, however, as the pressure is increased above and decreased below the prevailing, steady state pressure value.

In tests conducted with tap water the air pressure was increased and decreased 10 p.s.i. above and below the prevailing ambient once a second. At a temperature of 95° C. sharp on-off boiling occurred. The same results occurred with similar tests using sea water and a pressure cycle (above and below ambient) every 2.5 seconds. Periodically varying the pressure above and below the prevailing pressure caused bubbles to form in the bulk liquid on the evacuation phase of the cycle; on the pressurization phase of the cycle the bubbles collapsed. After the collapse of the bubbles, tiny bubbles remained in the liquid which appeared to serve as seeds for the bubble formation in the pressure cycle. If the cycle rate was too slow, however, the seed bubbles disappeared and the water became quiescent. Thus, under experimental conditions, one cycle every two seconds or less and a pressure excursion of about 10 p.s.i. gave good bubble stirring. With sea water, the best results occurred when the water was warmer than 50° C. The pressure cycle pattern employed in the test approached that of a sine wave though a square wave configuration should give better performance.

From the foregoing description, it should now be apparent that a new and useful liquid agitating and mixing apparatus and process are disclosed. This is accomplished by creating and/or expanding gas bubbles within a matrix liquid or solution by the controlled variation of the hydrostatic pressure within the liquid or solution. The invention is effective in increasing the rate of heat and mass transfer within an otherwise quiescent body of liquid that has been the cause of manifold problems in apparatus and processes utilizing and/or dependent upon the movement of liquids.

Though the invention has been described with a certain degree of particularity, it is to be understood that other variations, modifications and embodiments are possible within the scope and spirit of the invention. For example, the pressure modulating means 40 and 70 depicted in the figures are given by way of example only. Other modulating means may be employed without departing from the spirit and scope of the invention. Similarly, the apparatus and process described in connection with FIG. 1 is a batch type opeartion. The invention, however, can be used in continuous freezing-separating processes without departing from its spirit and scope.

What is claimed is:
1. Liquid stirring and agitating apparatus, comprising:
   a container arranged to hold a body of liquid in its lower portion and having a vapor space in its upper portion,
   means for alternately directly decreasing and increasing the pressure of the vapor within said container,
   said liquid forming a stagnant boundary layer adjacent internal surface portions of said container,
   said means being effective to alternately expand and contract gas bubbles within the liquid and within said boundary layer, the expanding and contracting bubbles being effective to energize and agitate the liquid in the boundary layer,
   an inlet conduit for admitting a solution to the container,
   means for indirectly cooling the solution, said cooling means being disposed along the bottom of said container and effective to freeze the solvent out of the solution onto the surface of the container, said freezing solvent and solution having a second stagnant boundary layer at their interface,
   the pressure decreasing and increasing means being effective to energize and agitate the liquid in said second boundary layer,
   heating means for melting the frozen solvent, said heating means being disposed along the side of said container adjacent the bottom,
   an outlet conduit for removing said solute from the container, said outlet being at a lower level than said inlet, and
   means for removing the melted solvent from the container.

(References on following page)

References Cited

UNITED STATES PATENTS

| | | | |
|---|---|---|---|
| Re. 22,126 | 6/1942 | McKittrick et al. | 203—100 |
| 2,683,178 | 7/1954 | Findley. | |
| 3,234,747 | 2/1966 | McMahon et al. | 62—58 |
| 3,290,891 | 12/1966 | De Lano et al. | 62—58 |
| 2,818,324 | 12/1957 | Thornton. | |
| 3,327,492 | 6/1967 | Goard et al. | 62—58 |
| 2,363,247 | 11/1944 | Holder | 259—1 |
| 2,620,894 | 12/1952 | Peterson et al. | |
| 2,705,407 | 4/1955 | Colonna | 260—707 |
| 2,916,266 | 12/1959 | Pray | 259—54 |
| 3,050,447 | 8/1962 | Olney | 203—91 |
| 3,117,768 | 1/1964 | Carlin | 259—72 |
| 3,174,832 | 3/1965 | Bohrer | 23—273 |
| 3,223,747 | 12/1965 | Bohrer | 259—1 |
| 3,261,170 | 7/1966 | McCarthy et al. | 23—273 |
| 3,367,848 | 2/1968 | Curtis et al. | 203—100 |
| 3,397,119 | 8/1968 | Bourland | 203—100 |
| 3,410,765 | 11/1968 | Bodine | 203—100 |

WILBUR L. BASCOMB, JR., Primary Examiner

U.S. Cl. X.R.

203—88, 99; 202—173; 259—98; 23—267, 273